Jan. 17, 1967   N. E. STEHLE   3,298,715
COUPLING HANDLING AND ACTUATING RING
Filed Dec. 26, 1963                                        2 Sheets-Sheet 2

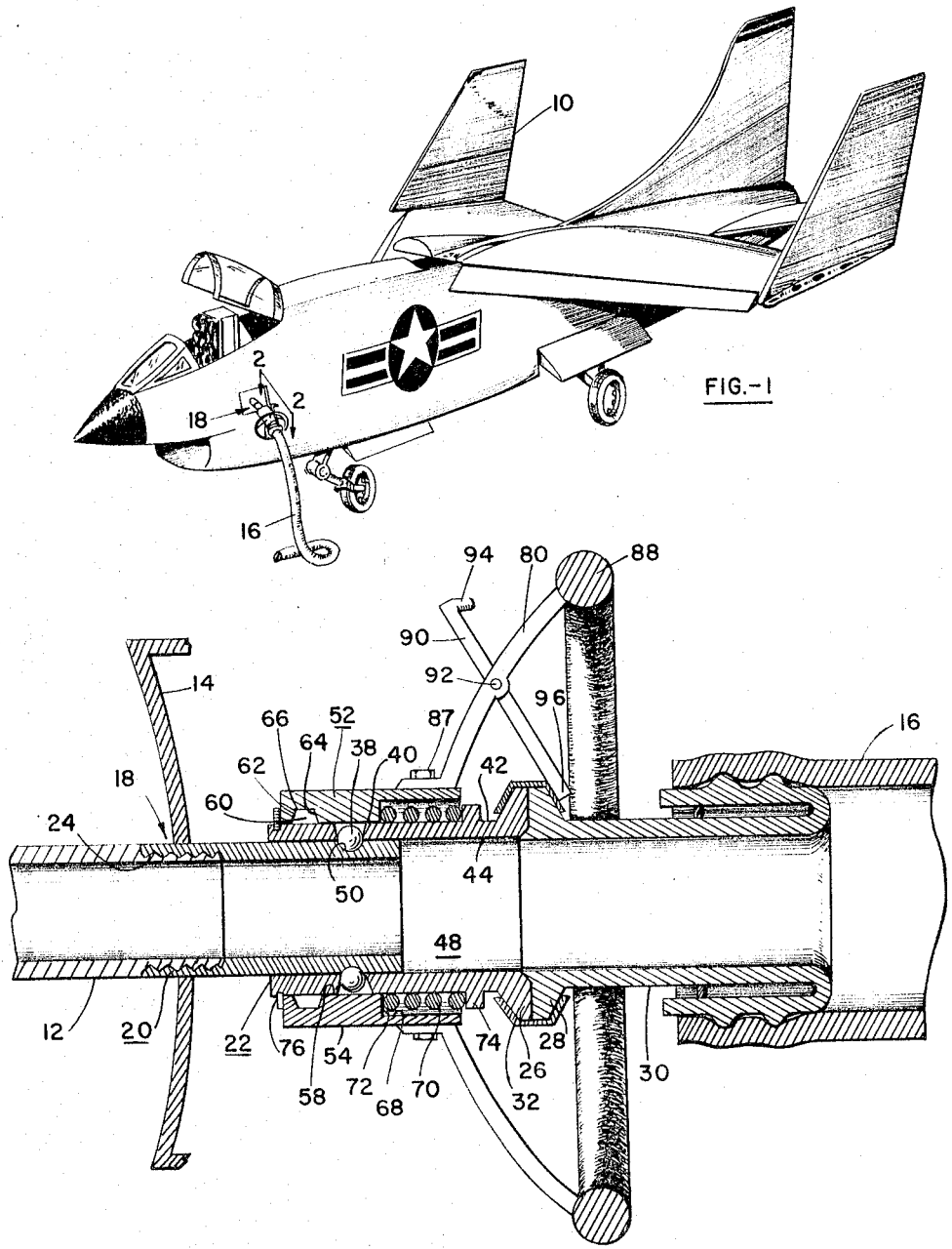

INVENTOR.
NORMAN E. STEHLE
BY
Arthur L. Collins
ATTORNEY

United States Patent Office 3,298,715
Patented Jan. 17, 1967

3,298,715
COUPLING HANDLING AND ACTUATING RING
Norman E. Stehle, Box 303, Forge Road,
Glen Mills, Pa. 19342
Filed Dec. 26, 1963, Ser. No. 333,768
1 Claim. (Cl. 285—18)

The invention described herein may be manufactured and used by or for the Government of the United States of America for governmental purposes without the payment of any royalties thereon or therefor.

This invention relates to couplings. It is particularly concerned with pipe couplings and has the provision of means by which a hot coupling may be manually handled rapidly with safety.

Jet engines on an aircraft are started by suppling them with compressed air from a movable source. The compressed air is passed from the source through a hose which is connected by a coupling to a conduit in the aircraft. After the starting is performed, the air supply line or hose is uncoupled. Because the air must be compressed to such high pressures, it has been found that the air reached such high temperatures that it could not safely be handled with the unprotected hands. Some means of protection is required for the hands of personnel performing the operation or else there must be sufficient delay in time to allow the coupling to cool. When there are sequential take-offs of aircraft, as from carriers, the coupling and uncoupling of the supply source to the various aircraft must be performed without the time delay for cooling.

With this situation in view, the invention is aimed at providing a coupling device which may be quickly coupled or uncoupled even though it is relatively hot; which offers maximum protection to the hands of a person handling the line; which is of simple and rugged construction; and which an operator may readily and quickly manipulate with one hand in a reliable manner.

The invention also lies in certain new features and combinations of parts, hereinafter set forth in the claim.

Although the features which are believed to be characteristic of the invention will be pointed out in the appended claim, the invention itself, as to its objects and advantages, mode of operation, and organization of elements may be better understood by referring to the following description in connection with the accompanying drawing, in which:

FIG. 1 is an elevational view showing a portion of an aircraft connected with an air line for starting its engine;

FIG. 2 is a longitudinal section of sectional view along line 2—2 of FIG. 1;

Figure 3:
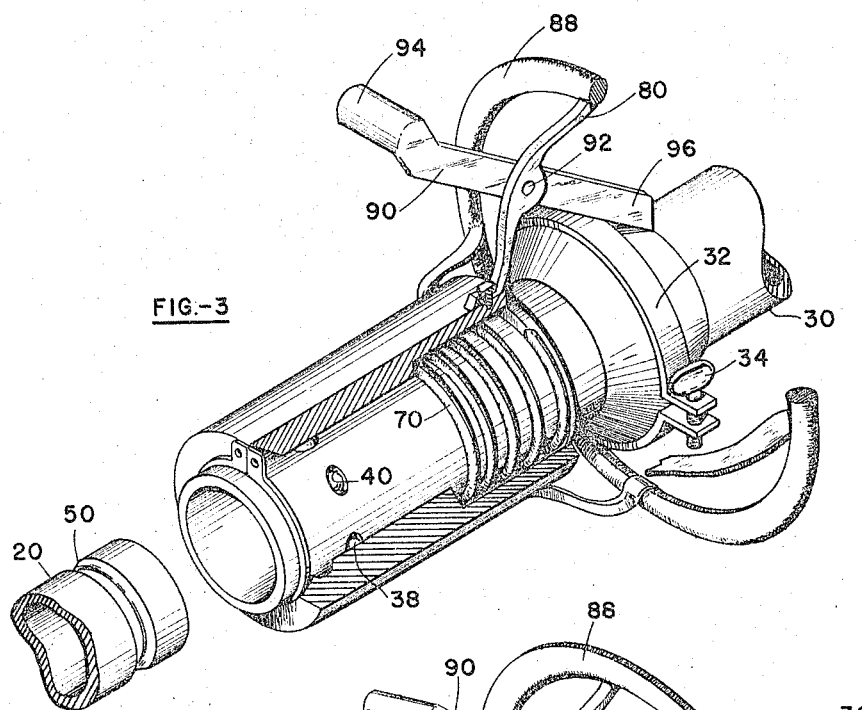
FIG. 3 is a perspective view showing the coupling in uncoupled relationship with parts broken away.

Referring to the drawing in FIG. 1, 10 indicates an aircraft equipped with jet engines, and other equipment, not shown, which require compressed air for starting. A fixed conduit 12, passing from the equipment to be started, has an end terminating near a fuselage wall 14 of the aircraft where it is accessible from the outside. A portion of a flexible line or hose is designated at 16 which extends from a source of compressed air, not shown, and is connected to conduit 12 by a coupler 18. Air is supplied to the aircraft from the hose 16 and conduit 12. After the engines are started, the hose 16 is disconnected and moved for coupling to other aircraft about take off.

The coupling 18, FIG. 2, includes two short tubes, a male or plug member 20 and a female or socket member 22, which are joined at one of their ends to the conduit 12 and hose 16, respectively, and are adapted to be coupled together at their other ends. Threads, 24, within the plug 20, are suitable for joining it to the conduit 12, since both are normally metallic. The socket member 22 preferably has an external flange 26 on its rearward or hose connecting end which mates with a flange 28 on a hose fitting or nipple 30. A clamp 32, having a take-up screw 34 (FIG. 3), encompasses the flanges 26 and 28 and draws them together. The connection between the hose and the female coupling member is made through the nipple 30. As a matter of convenience, it is easier to connect a hose to the nipple in the shop and then make the connections from the nipple to a couple member. Furthermore, punctures, etc. make it necessary to replace hose more frequently than defects make a coupler inoperative; thus, nippled hose is readily replaced.

At their adjacent ends, the plug 20 and socket 22 are designed for male to female engagement, that is the plug inserts into the socket, and is connected by sleeve actuated ball detents 38. The balls 38, are carried in conical holes, 40, in the socket that penetrate both the outer and inner surfaces, 42 and 44, of the socket wall. The holes 40 are spaced peripherically and each of them diverges outwardly. The openings of the holes 40 on the inner surface of the socket 22 are large enough to permit a portion of a ball to extend into the socket's bore 48. When the socket 22 and plug 20 are coupled, the portions of the balls 40 extending through the socket wall and seat in a circumferential groove 50 cut into the outer surface of the plug 20, as shown in FIG. 2.

An actuator for the ball detents 38 is provided in a sleeve member 52, having an outer surface 54 and a bore 58. It is mounted on the forward end of the socket 22 and is capable of being moved axially over the ball detent holes 40. A forward portion on the inner surface of the sleeve member 52 has an annular groove or chamber 60 defined by inwardly diverging sides 62 and 64 and a peripheral wall or bottom 66. The axial length and radial depth of the groove 60 is sufficient to receive at least a portion of the ball detents 38 equivalent to that which extends from the socket 22 into the plug 20. When the actuator sleeve 52 is disposed with its groove or chamber 60 over the detent holes 40, the ball detents 38 may move radially into the chamber 60 and the plug 20 can freely be moved into or out of the socket 22; whereas, for other dispositions of the sleeve actuator the plug 20 and socket 22 are connected by the detent balls 38.

A counterbore 68 is furnished in the rearward end of the socket 22 to house a helical spring 70 disposed around outer surface of the socket 22. Spring 70, interposed between the end 72 of the counterbore 68 and an outwardly directed flange 74 on the socket 20 urges the sleeve actuator 52 forwardly against a snap ring or stop 76 seated in a groove the outer surface of socket 22. The diameter of flange 74 is such that it fits within the counterbore 68 so that the sleeve actuator 52 may slide over it. With this construction, it is necessary to move the actuator sleeve 52 rearwardly, to the right in FIG. 2, to permit radially outward movement of the ball detents 38 for connection or disconnection of the coupling members; when the sleeve is released, the spring 70 urges it forward for coupling of the plug and socket.

At spaced peripherial intervals, there are a number of radial struts positioned around the rearward end of the actuator sleeve 52. Several of these struts are shown and one is indicated at 80. They are secured as by bolts 87, at their inner ends to the outer surface of the actuator sleeve 52. The struts are directed radially outwardly and rearwardly beyond the joint formed by the clamp 32. The outer ends of the struts are at an angle to the hose and secured, as by welds, to a handling ring 88. A lever 90 is pivotally secured intermediate its ends by a pin 92 to one of the struts 80. The outer end 94 of the lever 90 is bent at an angle, and its inner end 96 is disposed on the rearward side of the joint formed by the clamp 32. This structure provides a means of handling the hose with the socket 22 for making a connection or for disconnecting with the plug 20 without touching either the socket or the plug. This is a decided advantage when the size, weight and temperature of the hose line are appreciated. Typically, the hose weighs 2.3 pounds per foot, is 15 to 20 feet long, is 5 inches in outside diameter and heats to 450° F. after starting a jet aircraft. Because of this bulk and weight, handling of the coupling 18 requires use of both hands; with the ring 88, one hand is normally sufficient. Another advantage is the lever 90 may be grasped together with the ring 88 by one hand. Squeezing the lever 90 and ring 88 together will cause the inner end of the lever to engage the clamp 32. As a result, the actuator sleeve 52 will move rearwardly and the coupling 18 is disconnected. With a 9 inch diameter handling ring, 88, although the coupler members, 20 and 22, were heated to over 400° F., the ring temperature was less than 100° F. and it was not a danger to the unprotected hands. The handling ring also provides a skid for the socket when disconnected for its protection when dragged over a surface.

Figure 4:
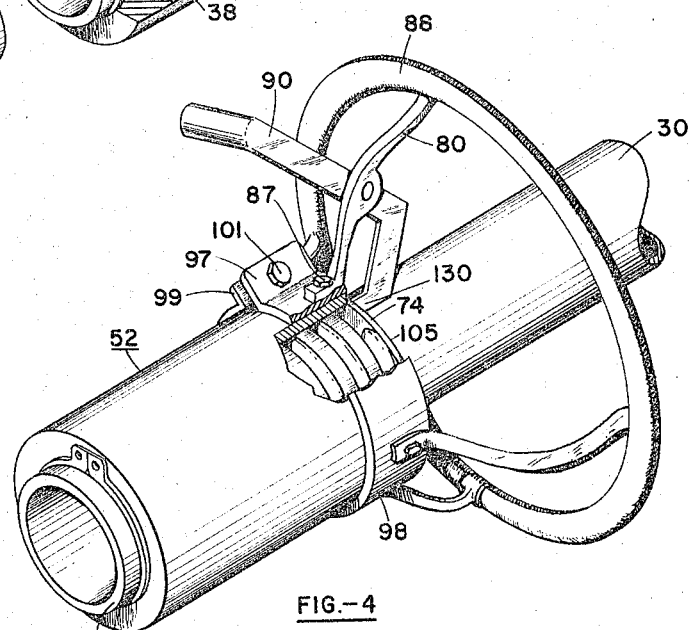
FIG. 4 is perspective view of the socket showing a modification.

In FIG. 4, a modification is shown in which the inner ends of the struts, 80, of the handling ring 88 are secured, as by welds, to a split ring 98, having its ends 97 and 99 turned radially outwardly. A bolt 101 passing through the split ring ends 97 and 99 provides a means for removably fixing the handling device to the actuator sleeve 52. The inner end of the lever 90 is also modified. It is bent in an axial and forward direction to form a projection 130 which fits between the actuator sleeve 52 and the outer surface of the socket 22 for engagement with the rearward side 105 of the abutment flange 74. The modification is a provision for sleeve actuator couplings not having the flanged hose and socket joint and clamp 32, shown in FIGS. 1 and 2. Also, because the handling ring sustains most of the blows from the dropping, dragging, etc. of the hose with the socket member, a damaged handling ring can readily be removed or replaced without tying up a coupling member.

What is claimed is:

In a system for supplying compressed air from a ground based source to a jet aircraft to be started:
(a) a first conduit which extends from said aircraft;
(b) a first tubular coupling member secured at one end to the first conduit;
(c) a hose extending from the ground based source;
(d) a nipple secured at one end to the free end of said hose, the other end of the nipple being flanged outwardly;
(e) a second coupling member, one end of the second coupling member being flanged outwardly to engage and mate with the flanged end of the nipple, the other end of the second coupling member being adapted to receive the other end of the first coupling member;
(f) clamping means which encircles and secures the flanged ends of the nipple and the second coupling member in axial alignment;
(g) a ball detent which is disposed in a tapered aperture in the second coupling member and which engages an external peripheral groove in the first coupling member when the first coupling member is inserted into the second coupling member;
(h) a detent operator mounted for axial movement on the outer peripheral surface of the second coupling member;
(i) an abutment flange which extends outwardly from the second coupling member;
(j) a spring which is interposed between the abutment flange and the detent operator and which urges the detent operator toward a position away from alignment of the upper portion of the tapered aperture in the second coupling member and peripheral groove in the inner surface of the detent operator;
(k) a handling ring;
(l) an elongated strut element which is secured at one end to the handling ring and at its other end to the detent operator so as to space the ring from the second coupling member in a predetermined manner;
(m) an elongated lever which is secured intermediate its ends to an intermediate portion of the strut element, one end of the lever being disposed adjacent the hose end of the clamping means for engagement therewith and movement of the detent operator against the bias of the spring when the other end of the lever is operated.

References Cited by the Examiner

UNITED STATES PATENTS

| | | | |
|---|---|---|---|
| 2,730,382 | 1/1956 | De Mastri | 285—277 |
| 2,862,731 | 12/1958 | Hedden et al. | 285—367 X |
| 2,894,763 | 7/1959 | Karnath et al. | 280—422 X |
| 2,921,802 | 1/1960 | Canner | 285—277 X |
| 2,930,633 | 3/1960 | Ethington et al. | 285—277 X |
| 3,214,195 | 10/1965 | Zahuranec et al. | 285—312 X |

FOREIGN PATENTS

| | | |
|---|---|---|
| 847,163 | 6/1939 | France. |
| 749,795 | 5/1956 | Great Britain. |
| 25,811 | 11/1908 | Sweden. |

CARL W. TOMLIN, *Primary Examiner.*

THOMAS F. CALLAGHAN, *Examiner.*